United States Patent [19]

Shultz et al.

[11] Patent Number: 5,071,897

[45] Date of Patent: Dec. 10, 1991

[54] MELT EXTRUDED BLENDS OF BIPHENOL-ORGANOSILICON MATERIAL REACTION PRODUCTS HAVING ENHANCED RATES OF CRYSTALLIZATION

[75] Inventors: Allan R. Shultz, Scotia; Susan A. Nye, Feura Bush, both of N.Y.

[73] Assignee: General Electric Company, Schenectady, N.Y.

[21] Appl. No.: 604,287

[22] Filed: Oct. 29, 1990

[51] Int. Cl.5 .............................................. C08K 5/24
[52] U.S. Cl. .................................. 524/265; 524/132; 524/295
[58] Field of Search ....................... 524/265, 132, 295

[56] References Cited

U.S. PATENT DOCUMENTS 4,397,973 8/1983 Scott et al. ........................... 524/265
4,954,549 9/1990 Lewis et al. ......................... 524/265

Primary Examiner—Melvyn I. Marquis
Assistant Examiner—Margaret W. Glass
Attorney, Agent, or Firm—William A. Teoli; James C. Davis, Jr.; William H. Pittman

[57] ABSTRACT

Certain crystallization accelerators, such as 1,3-dixylenoxy-1,1,3,3-tetramethyl-disiloxane have been found effective for greatly enhancing the crystallization rate and broadening the temperature region in which crystallization of biphenol-organosilicon reaction products can occur from the melt during cooling.

5 Claims, No Drawings

MELT EXTRUDED BLENDS OF BIPHENOL-ORGANOSILICON MATERIAL REACTION PRODUCTS HAVING ENHANCED RATES OF CRYSTALLIZATION

CROSS REFERENCE TO RELATED APPLICATION

Reference is made to copending application Ser. No. 07/497,155, filed 3-21-90 which is a continuation-in-part of application Ser. No., 07/353,713, filed May 18, 1989, now abandoned.

BACKGROUND OF THE INVENTION

The present invention relates to injection moldable flame retardant reaction products of biphenol and organosilicon material which have been melt extruded with certain crystallization accelerators.

Prior to the present invention, as shown by copending application 07/497,155, polymeric reaction products of biphenol and organosilicon material were provided consisting essentially of chemically combined groups of the formula, $$\left[ R^2-O-\left[ \begin{array}{c} R^1 \\ | \\ Si-O \\ | \\ R^1 \end{array} \right]_n \right] \quad (1)$$

where $R^1$ is selected from the same or different $C_{(1-13)}$ monovalent hydrocarbon radicals, and $C_{(1-13)}$ monovalent hydrocarbon radicals substituted with monovalent radicals inert during condensation. $R^2$ is a member selected from the class consisting of,

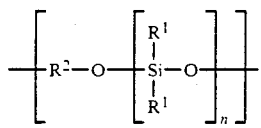

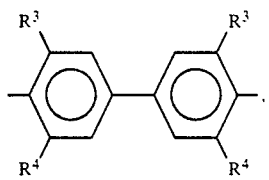

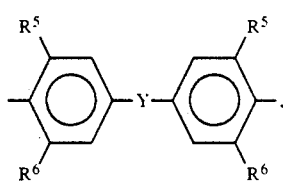

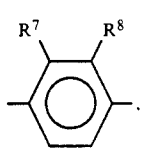

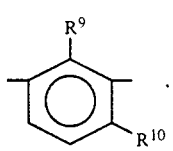

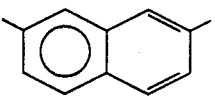

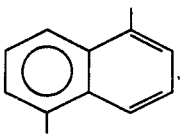

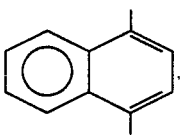

, and

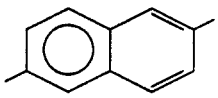

Y is a member selected from the class consisting of $-C(CH_3)_2-$, $-CH_2-$, $-SO_2-$, $-S-$, $-O-$.

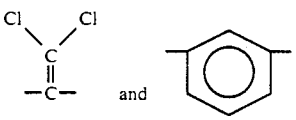

$R^3$, $R^4$, $R^5$, $R^6$, $R^6$, $R^8$, $R^9$, and $R^{10}$ are members selected from the class consisting of the same or different radicals consisting of hydrogen and $C_{(1-13)}$ monovalent hydrocarbon radicals included within $R^1$ radicals. and n is an integer equal to 1 to 4 inclusive.

The preferred form of the organosilicon materials of formula (1) is poly(silyloxytetraalkylbiphenyleneoxides consisting essentially of chemically combined groups of the formula,

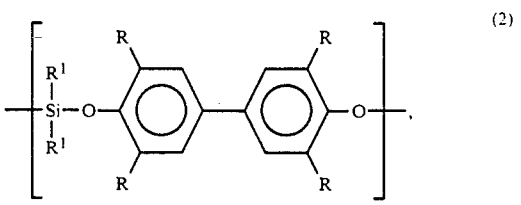

where R is selected from the same or different $C_{(1-8)}$ alkyl radicals, and $R^1$ is as previously defined.

Polymeric reaction products included within formula (1), referred to hereinafter as "polyaryloxysiloxanes" or "PAS resins", have been found to crystallize only slightly, or not at all, when cooled rapidly from their melts. The PAS resins can be converted by injection molding to transparent, amorphous articles having good mechanical properties and excellent resistance to burning. However, their upper use temperature is restricted to temperatures somewhat below their glass transition temperature, which can be about 145° C. It has been known that semi-crystalline polymers can retain their high modulus, and thereby their useful physical properties well above their glass transition temperatures, if the polymer is filled with glass fiber or other particulate fillers. Experience has shown that improvements in the crystallinity of molded polymeric materials are desirable to improve the non-sag and non-drip behavior of the molded article. In addition, the semi-crystalline state tends to increase resistance to environmental attack by solvents and gaseous penetrants. Accordingly, efforts have been made to provide PAS resin compositions which will crystallize rapidly from their melts in such operations as injection molding.

It has been found that PAS resins having IV's in the range of 0.5 to 2.0 dl/gm can form amorphous, glassy solids when rapidly cooled from their melts. Upon heating amorphous PAS resin from room temperature at a rate of 20° C./min, the resin passes through its glass transition temperature, crystallizes and then melts. For example, if the glass transition temperature of a particular PAS resin is 146° C., the crystallization peak rate can occur at 205° C. with a total crystallization heat release of 17.5 J/gm. The resin can then melt with the peak melting rate occurring at about 270° C. with an observed total melting heat absorption 17.2 J/gm.

Although PAS resins will crystallize when heated from their amorphous, glassy condition, they crystallize rather slowly while cooling from the molten state. In order to provide melt extruded PAS pellets which can be converted to crystalline injection molded parts, a crystallization enhancement method is required.

SUMMARY OF THE INVENTION

The present invention is based on the discovery that if PAS resin is melt extruded with an effective amount of a crystallization accelerator, including a siloxane having the formula,

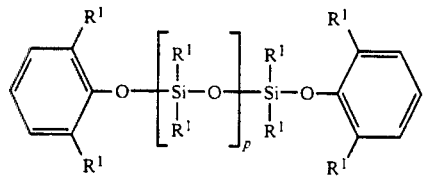

(3)

hereinafter referred to as "DXODS", where $R^1$ is as previously defined, and p is a whole number equal to 0 to 10 inclusive, the resulting melt extruded blend can undergo rapid crystallization during cooling from the molten state following injection molding. It has been further found other commercially available materials such as glyceryl tribenzoate and isopropylated triphenyl phosphate also can be used as crystallization accelerators when melt extruded in effective amounts with PAS.

STATEMENT OF THE INVENTION

There is provided by the present invention, melt extruded injection moldable flame retardant blends of polymeric reaction products of biphenols and organosilicon materials consisting essentially of chemically combined groups of formula (1) and an amount of a compatible additive which is effective for enhancing the rate and broadening the temperature region at which crystallization of the polymeric reaction product of biphenols and organosilicon materials can occur from the melt during cooling.

(A) effecting reaction between a biphenol of the formula,

(4)

and a difunctional organosilicon material selected from the class consisting of a polyorganosilazane, a cyclopolyorganosilazane, a bisureidosilane, a α, ω bisaminopolysiloxane, and an organosilane of the formula,

(5)

(B) recovering from (A), the polymeric reaction product of the biphenol and difunctional organosilicon material, where $R^1$ and $R^2$ are as previously defined and X is a hydrolyzable radical.

Some of the organosilanes of formula (5) which can be used to make PAS resins used in the present invention are organosilanes, such as

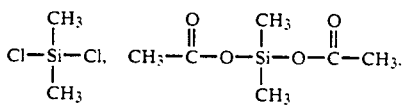

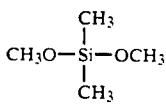

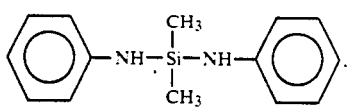

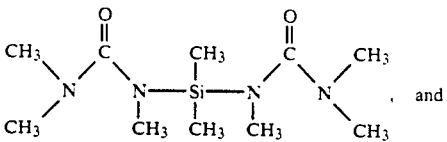

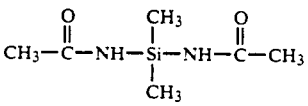

Some of the organosilazanes which can be used as difunctional organosilicon material in making PAS resins are for example, difunctional silazanes shown by Martellock, U.S. Pat. No. 3,243,404 and Rochow, Chemistry of the Silicones, Second Edition 1951, John Wiley & Sons New York, Table 10, page 186 which are incorporated herein by reference. For example there can be used hexamethylcyclotrisilazane, and octamethylcyclotetrasilazane.

The PAS resins having condensed groups of formula (2), are preferably made by effecting reaction between a tetraalkylbiphenol of the formula,

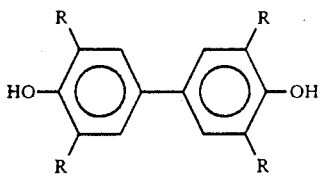

and a difunctional organosilicon material as previously defined, including an organosilane of formula (5), where R and X are as previously defined.

Radicals included by R of formulas (2) and (6) are alkyl radicals, such as methyl, ethyl, propyl, butyl, pentyl and hexyl; radicals included by $R^1$ are, for example, R radicals as previously defined, and substituted R radicals, such as trifluoropropyl, cyanoalkyl, such as cyanoethyl and cyanopropyl; alkenyl radicals such as vinyl and propenyl; cycloaliphatic radicals, such as cyclopentyl, and cyclohexyl. $R^1$ also can be aryl radicals, such as phenyl, xylyl, tolyl, naphthyl and anthryl; and halogenated aryl radicals, such as chlorophenyl and bromotolyl, as well as nitroaryl radicals, such as nitrophenyl and nitrotolyl.

Radicals included within X of formula (5) are for example halo, such as chloro, amino, amido, imido, ureido, alkoxy and acyloxy.

The PAS resins having condensed units of formula (1) have been found to be flame retardant. The PAS resins having condensed units of formula (2) can have a molecular weight in the range of about 5,000 to about 1,000,000 and an intrinsic viscosity of from about 0.1 to 6.0 dl/gm at 25° in chloroform. Crystallization accelerators can be utilized at from 1 to 40 parts by weight of crystallization accelerator, per 100 parts by weight of PAS. In addition to the siloxanes of formula (3), commercially available materials which are often used as compatible flame retardants or as plasticizers in non-crystalline resins can be used. There are included by these commercially available materials, dioctyl phthalate and tricresyl phosphate.

In addition to crystallization accelerators, the PAS resin can be blended with inert fillers, such as glass fiber, mica, clay, talc, titanium dioxide and silica; a proportion of from about 1 to about 200 parts of weight of filler, per 100 parts of PAS resin can be used.

In order that those skilled in the art will be better able to practice the present invention, the following examples are given by way of illustration and not by way of limitation. All parts are by weight unless otherwise indicated.

EXAMPLE 1

A mixture of 48.4 g of tetramethylbiphenol, 14.64 g of octamethyltetrasilazane and 50 mL of ortho-dichlorobenzene was refluxed under nitrogen. The emmision of ammonia was monitored. After 5 hours of reflux at 295° C., the viscous reaction mixture was cooled to about 40° C. and poured slowly into 500 mL of isopropyl alcohol. A white fibrous solid precipitated from the mixture. The product was collected and twice reslurried with 150 ml isopropyl alcohol. A filter cake of the product was collected after the final wash and pressed with dental dam to express as much of the solvent as possible. The product was then dried at 140° C. in vacuo for 4 hours. There was obtained 53.4 grams (89%) of product. Based on method of preparation and GPC analysis ($CHCl_3$ as mobile phase, using polystyrene standards), the product was a poly (dimethylsilyloxytetramethylbiphenyleneoxide) or a PAS resin having a M(n) of 28,244 and M(w) of 87,286.

There was slowly added 300 grams (1.46 moles) of 1,3-dichloro-1,1,3,3-tetramethyl-disiloxane to a stirred mixture under a nitrogen blanket of 360 grams (2.95 moles) of 2,6-xylenol, 303 grams (3.0 moles) of triethylamine and 100 ml. of diethylether. During the addition, triethylammonium salt slowly formed. The reaction mixture was stirred at room temperature for 18 hours. Triethylammonium salt was filtered, washed often with ether and the filtrate was concentrated to a yellow oil. The product was purified by distillation (175° C. at 0.2 torr). There was obtained 212 grams (55% of theoretical) of the clear nearly colorless product. Based on method of preparation, the product was bisxylyloxytetramethyldisiloxane, or DXODS.

Granules of a PAS, designated PAS 1 and having an intrinsic viscosity of 1.15 dl/gm, were heated at 310° C. for 10 to 12 minutes under a nitrogen flow to remove any volatiles. PAS 1 was then sealed in a vapor tight aluminum DSC pan with sufficient DXODS to yield a homogeneous 8.1 weight percent DXODS mixture after diffusional mixing at 150° C. for 4 hours. In a separate sealed pan, a sample of the devolatilized PAS 1 was also held at 150° C. for 4 hours to provide a comparative sample for differential scanning calorimetric (DSC) observations of crystallization.

The pure PAS 1 and PAS 1/DXODS (0.919/0.081 w./w.) mixture were subjected to controlled $-40°$/min. cooling rate experiments after 5 minute holds in molten state at 310° C. The pure PAS 1 exhibited no crystallization heat release. The PAS 1/DXODS mixture containing 8.1 weight percent DXODS exhibited a crystallization onset at 187.5° C. and a crystallization rate maximum at 173° C. The total crystallization heat release of the mixture was 16.2 J./gm. (17.6 J./gm. of PAS 1).

EXAMPLE 2

Following the procedure of Example 1, a PAS 1/DXODS mixture containing 27.5 weight percent of DXODS was prepared. PAS 1 crystallization occurred in the mixture during programmed $-40$, $-80$ and $-160$ deg./min. cooling rates. There were obtained crystallization heat releases of 17.3, 16.8 and 16.6 J./gm., respectively which corresponded to 23.9, 23.2 and 22.9 J./gm. of PAS 1. These results showed that PAS 1 crystallization can occur during very rapid cooling and to a higher extent than at the 8.1 weight percent DXODS composition.

EXAMPLE 3

A lower molecular weight PAS, "PAS 2", having an intrinsic viscosity 0.56 dl./gm., did not crystallize during cooling at $-160$ deg./min. Partial crystallization occurred at slower cooling rates providing $-9.9$ J./gm. at $-80$ deg./min., and $-22.9$ J./gm. at $-40$ deg./min.. A PAS 2/DXODS mixture containing 9.0 weight percent DXODS was prepared as in Example 1. It was found that PAS 2 crystallization occurred in this mixture even at a $-160$ deg./min. cooling rate.

EXAMPLE 4

Mixtures of PAS 2 with DXODS, and mixtures of PAS 2 with K-50 (Kronitex 50, an isopropylated triphenyl phosphate made by the FMC Corp.) and BS-404 (Benzoflex S-404, a glyceryl tribenzoate made by the Velsicol Corp.) were prepared and examined for crystallization behavior as described in Example 1. DSC traces showed crystallization heat releases occurring with the three PAS 2 additive compositions during programmed cooling at −160° C./min. Crystallization heats and temperatures at which peak crystallization rates occurred during cooling from 300° C. are shown as follows in Table 1 for the various PAS/additive compositions at three programmed cooling rates.

TABLE 1

| Additive | PAS2/Additive (w/w) | Crystallization Heat (−J/gm)*** | | | Crystallization Peak Temp. (C.) | | |
|---|---|---|---|---|---|---|---|
| | | −40/min | −80/min | −160/min | −40/min | −80/min | −160/min |
| None | 100/0 | 22.9 | 9.9 | 0.0 | 196 | 174 | — |
| DXODS | 91/9 | 21.5 | 19.9 | 19.3 | 191 | 170 | 135 |
| | 83/17 | 19.6 | 19.5 | 18.0 | 184 | 175 | 163 |
| K-50 | 95/5 | 20.8 | 12.6 | 6.9 | 159 | 148 | 129 |
| | 91.9 | 19.3 | 21.7 | 15.2 | 189 | 169 | 146 |
| | 86/14 | 20.6 | 19.1 | 18.9 | 177 | 164 | 148 |
| BS-404 | 95/5 | 20.4 | 12.3 | 4.6 | 168 | 150 | 109 |
| | 90/10 | 19.4 | 15.9 | 4.9 | 161 | 146 | 107 |
| | 85/15 | 16.5 | 13.5 | 7.6 | 149 | 144 | 100 |

***Heat release per gram of total sample.

The above results show that each of the three additives increases the PAS cyrstallization and that DXODS is more effective as a crystallization accelerator than K-50 or BS-404.

EXAMPLE 5

A high molecular weight PAS resin, "PAS 3", having an intrinsic viscosity of 1.03 dl/gm, was blended with DXODS, extruded, and pelletized by means of a 28 mm Werner & Pfleiderer twin screw extruder. The dried pellets were then injection molded in a 28 ton Engel injection molding machine. The molded PAS 3/DXODS resin samples were examined by DSC for crystallinity. The PAS 3/DXODS blending and pelletizing procedure was as follows:

The 28 mm twin screw W&P extruder was operated at 250 rpm with five zones having barrel temperatures of about 300°, 405°, 510°, 510° F. and 515° F. and a die temperature of about 530° F. The PAS 3 was conveyed into the 300° F. zone at a rate of 34.5 gm/min and the DXODS was pumped into the first 510° F. zone at 3.0 gm/min. A melt temperature probe registered 577° F. at the die face. The PAS 3/DXODS strand was quenched in a water trough and chopped into pellets.

Injection molding was accomplished in the following manner:

The PAS 3/DXODS (92/8 w/w) resin pellets were oven dried at 80° C. for seven hours. The resin was fed into the 28 ton Engel molding machine and conveyed through three zones having approximate barrel temperatures of 430°-440° F., 480°-490° F., and 505°-510° F. Nozzle temperatures in the range of 505°-520° F. were employed. Mold temperatures were 305°-340° F. Injection times were 8 sec and mold open times were 2 sec. Closed mold times of 20, 30, 40, and 50 sec were variously employed to provide samples for DSC evaluation.

The molded PAS 3/DXODS (92/8 w/w) resin samples were found to be opaque, high modulus materials. DSC scans (20 deg/min, 280-580K) of the respective molded samples revealed no crystallization exotherms during heating. All samples exhibited melting endotherms with the usual broad peak, or a shoulder, near 266° C. and a final sharp peak near 284° C. Table 2 lists the observed melting peak temperatures and heats of melting for the samples at four closed mold times.

TABLE 2

| DSC Data on an Injection-Molded PAS 3/DXODS (92/8) Mixture (20 C./min heating; 280-580 K.) | | |
|---|---|---|
| Closed Mold Time (sec) | Melting Peak Temp. (C.) | Melting Heat (J/gm) |
| 50 | (264) 283 | 29.2 |
| 40 | (267) 283 | 25.6 |
| 30 | (266) 284 | 24.3 |
| 20 | (263) 285 | 25.6 |

The above results show that substantially the same degree of crystallization occurred with the injection molded PAS 3/DXODS blend after closed mold times of 20 to 50 sec.

Although the above examples are directed to only a few of the very many variables which can be used in the practice of the present invention, it should be understood that the present invention is directed to a much broader variety of melt extruded injection moldable flame retardant blends as shown by the biphenols and organosilicon materials included within formula (1) and the compatible additives set forth in a description preceding these examples. The incorporation of solid reinforcing agents such as chopped glass fiber or other particulate fillers to extend the use temperature range of such blends lies within the practice of this invention.

What is claimed is:

1. A melt extruded injection moldable flame retardant blend of a reaction product of a biphenol and an organosilicon material, which reaction product consists essentially of chemically combined groups of the formula,

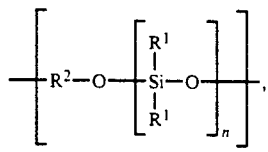

and an amount of a compatible additive which is effective for enhancing the crystallization rate and broadening the temperature range in which crystallization of the polymeric biphenol and organosilicon reaction product can occur from the melt during cooling, where $R^1$ is a member of the class consisting of $C_{(1-13)}$ monovalent hydrocarbon radicals, and $C_{(1-13)}$ monovalent hydrocarbon radicals substituted with monovalent radicals inert during condensation, $R^2$ is a member selected from the class consisting of,

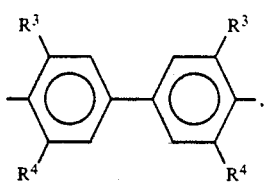

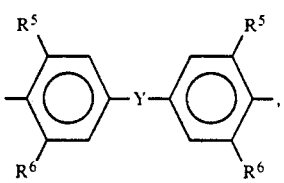

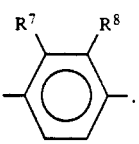

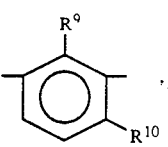

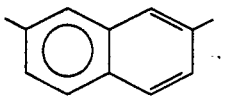

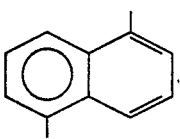

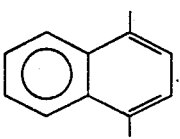

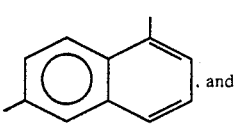, and

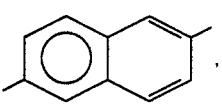

Y is a member selected from the class consisting of —C(CH$_3$)$_2$—, —CH$_2$—, —SO$_2$—, —S—, —O—,

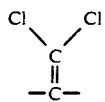 and 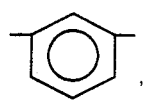, $R^3$, $R^4$, $R^5$, $R^6$, $R^7$, $R^8$, $R^9$, and $R^{10}$ are members selected from the class consisting of the same or different radicals consisting of hydrogen and C$_{(1-13)}$ monovalent hydrocarbon radicals included within R$^1$ radicals, and n is an integer equal to 1 to 4 inclusive.

2. A melt extruded injection moldable flame retardant blend in accordance with claim 6, where the reaction product of biphenol and organosilicon material consists essentially of chemically combined groups having the formula,

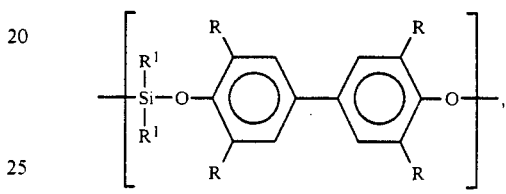

where R is a member selected from the class consisting of the same or different C$_{(1-8)}$ alkyl radicals, and R$^1$ is a member selected from the class consisting of the same of different C$_{(1-13)}$ monovalent hydrocarbon radicals and C$_{(1-13)}$ monovalent hydrocarbon radicals substituted with monovalent radicals inert during condensation.

3. A melt extruded injection moldable flame retardant blend in accordance with claim 6, where the compatible additive is,

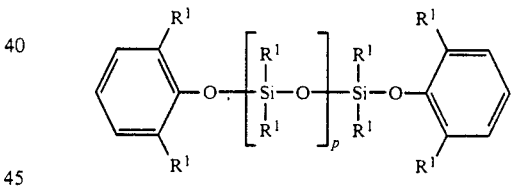

where R$^1$ is a member of the class consisting of C$_{(1-13)}$ monovalent hydrocarbon radicals, and C$_{(1-13)}$ monovalent hydrocarbon radicals substituted with monovalent radicals inert during condensation, and p is a whole number equal to 0 to 10 inclusive.

4. A melt extruded injection moldable flame retardant blend in accordance with claim 3, where the compatible additive is,

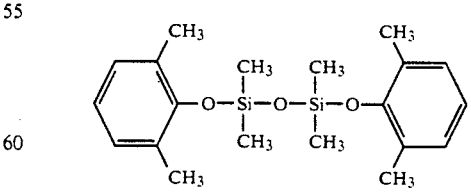

5. A melt extruded injection moldable flame retardant blend in accordance with claim 1, where the reaction product if biphenol and organosilicon material is a poly(dimethylsilyloxytetramethylbiphenyleneoxide).

* * * * *